United States Patent
Liang et al.

(10) Patent No.: US 11,643,575 B2
(45) Date of Patent: May 9, 2023

(54) ETHYLENE-VINYL ALCOHOL COPOLYMER RESIN COMPOSITION, ETHYLENE-VINYL ALCOHOL COPOLYMER FILM FORMED THEREFROM, AND MULTILAYER STRUCTURE CONTAINING THE SAME

(71) Applicant: CHANG CHUN PETROCHEMICAL CO., LTD., Taipei (TW)

(72) Inventors: Chih Chieh Liang, Taipei (TW); Wen Hsin Lin, Taipei (TW)

(73) Assignee: CHANG CHUN PETROCHEMICAL CO., LTD., Taipei (TW)

( * ) Notice: Subject to any disclaimer, the term of this patent is extended or adjusted under 35 U.S.C. 154(b) by 0 days.

(21) Appl. No.: 17/701,173

(22) Filed: Mar. 22, 2022

(65) Prior Publication Data

US 2022/0403212 A1    Dec. 22, 2022

(30) Foreign Application Priority Data

Jun. 16, 2021 (CN) .......................... 202110666705.7
Jun. 16, 2021 (TW) ................................. 110121918

(51) Int. Cl.
| | | |
|---|---|---|
| *C09J 7/29* | (2018.01) | |
| *B32B 7/12* | (2006.01) | |
| *B32B 27/08* | (2006.01) | |
| *B32B 27/30* | (2006.01) | |
| *B32B 27/32* | (2006.01) | |
| *C08K 3/08* | (2006.01) | |
| *C08K 3/38* | (2006.01) | |

(52) U.S. Cl.
CPC .................. *C09J 7/29* (2018.01); *B32B 7/12* (2013.01); *B32B 27/08* (2013.01); *B32B 27/306* (2013.01); *B32B 27/32* (2013.01); *C08K 3/08* (2013.01); *C08K 3/38* (2013.01); *B32B 2250/246* (2013.01); *B32B 2307/538* (2013.01); *C08K 2003/0818* (2013.01)

(58) Field of Classification Search
CPC ... C09J 7/29; B32B 7/12; B32B 27/08; B32B 27/306; B32B 27/32; B32B 2250/246; B32B 307/538; C08K 3/08; C08K 3/38; C08K 2003/0818
USPC ....................................................... 428/474.4
See application file for complete search history.

(56) References Cited

U.S. PATENT DOCUMENTS

2005/0107507 A1* 5/2005 Ikeda .................. C08L 23/0861
                                                              524/424

FOREIGN PATENT DOCUMENTS

| JP | H-11291244 A | 10/1999 | |
|---|---|---|---|
| JP | H-11294947 A | 10/1999 | |
| TW | 200303870 A | 9/2003 | |
| TW | 201920432 A | 6/2019 | |
| WO | WO-2019/039458 A1 | 2/2019 | |
| WO | WO-2019039458 A1 * | 2/2019 | ................ C08F 8/12 |

OTHER PUBLICATIONS

Translation of WO 2019039458, Feb. 28, 2019. (Year: 2019).*

* cited by examiner

*Primary Examiner* — Hui H Chin
(74) *Attorney, Agent, or Firm* — Muncy, Geissler, Olds & Lowe, P.C.

(57) ABSTRACT

The present invention relates to an ethylene-vinyl alcohol copolymer (EVOH) resin composition, an EVOH film formed therefrom, and a multilayer structure containing the same. The surface roughness of the EVOH resin composition is the peak material volume (Vmp) between 0.0008 and 10 μm³/μm². The EVOH of the invention can reduce the torque output during processing, and can obtain the EVOH film with excellent appearance.

14 Claims, No Drawings

ETHYLENE-VINYL ALCOHOL COPOLYMER RESIN COMPOSITION, ETHYLENE-VINYL ALCOHOL COPOLYMER FILM FORMED THEREFROM, AND MULTILAYER STRUCTURE CONTAINING THE SAME

BACKGROUND OF THE INVENTION

1. Technical Field

The present invention relates to an ethylene-vinyl alcohol copolymer (EVOH) resin composition. The ethylene-vinyl alcohol copolymer resin composition has high surface uniformity, in particular, its surface roughness is the peak material volume (Vmp) between 0.0008 and 10 $\mu m^3/\mu m^2$. The present invention also discloses a film formed from the EVOH resin composition and a multilayer structure containing the EVOH resin composition.

2. Description of Related Art

EVOH resins are widely used in laminates for preserving perishable items. For example, EVOH resins and laminates are commonly used by the food packaging industry, medical device and supplies industry, pharmaceutical industry, electronics industry, and agrochemical industry. EVOH resins are often incorporated as a distinct layer within a laminate to serve as an oxygen-barrier layer.

The conventional EVOH pellets made of EVOH resin have large surface roughness and high friction between pellets, resulting in extremely high torque during EVOH processing. Although the processability of EVOH was adjusted by adding slip agent in the past, there is still a need for further improvement.

BRIEF SUMMARY OF THE INVENTION

In view of the continuous demand for EVOH resin composition that can reduce the torque output during processing and achieve high surface uniformity.

The present invention relates to an ethylene-vinyl alcohol copolymer (EVOH) resin composition having high surface uniformity, wherein the EVOH resin composition includes an ethylene-vinyl alcohol copolymer resin. For example, the surface roughness of the EVOH resin composition is the peak material volume (Vmp) between 0.0008 and 10 $\mu m^3/\mu m^2$. In addition, the surface roughness of the EVOH resin composition can further be the core material volume (Vmc) between 0.005 and 50 $\mu m^3/\mu m^2$, and/or the maximum peak height (Sp) between 0.005 and 7 $\mu m$. The EVOH resin composition can be in the form of pellet(s), film(s), fiber(s) and the like. The EVOH resin composition can be used to prepare films or multilayer structures. The inventor found that by controlling the surface roughness of EVOH resin composition, the torque output during EVOH processing can be reduced, and the film formed from the EVOH resin composition and the multilayer structure containing the EVOH resin composition can have an excellent appearance.

Additionally or alternatively, the maximum line height (Rz) of the surface of the EVOH resin composition is about 0.01-13 $\mu m$; or the Rz of the surface of the EVOH resin composition is 0.01-9.9 $\mu m$.

In a non-limiting example, the moisture content of the EVOH resin composition is less than 1 wt %.

In another aspect of the present invention, an EVOH resin composition (or pellets thereof) that can have a boron content of 5 to 550 ppm is provided. The EVOH resin composition may have an alkali metal content of about 5 to 550 ppm. Additionally or alternatively, the EVOH resin composition may further include one or a combination of the group consisting of cinnamic acid, conjugated polyene, slip agent and alkaline earth metal.

Additionally or alternatively, the ethylene-vinyl alcohol copolymer resin in the EVOH resin composition may have a saponification degree of 99.5 mole % or higher. The ethylene-vinyl alcohol copolymer resin in the EVOH resin composition may have an ethylene content of about 20 to about 48 mole %. For example, the ethylene content of the ethylene-vinyl alcohol copolymer may be about 25 to about 45 mole %. The EVOH resin composition may be formed of two or more EVOHs having different ethylene contents.

According to at least one embodiment, the multilayer structure includes: (a) at least one layer formed of the aforementioned ethylene-vinyl alcohol copolymer resin; (b) at least one polymer layer; and (c) at least one adhesive layer. The polymer layer may be selected from the group consisting of a low-density polyethylene layer, a polyethylene grafted maleic anhydride layer, a polypropylene layer, and a nylon layer, for example. The adhesive layer is a tie layer.

DETAILED DESCRIPTION OF THE INVENTION

The present invention relates to an ethylene-vinyl alcohol copolymer (EVOH) resin composition. The EVOH resin composition has low surface roughness, in particular, the surface roughness is the peak material volume (Vmp) between 0.0008 and 10 $\mu m^3/\mu m^2$. In addition, the surface roughness of the EVOH resin composition may further be the core material volume (Vmc) between 0.005 and 50 $\mu m^3/\mu m^2$, and/or the maximum peak height (Sp) between 0.005 and 7 $\mu m$. The control of the surface roughness of the EVOH resin composition can be achieved by adjusting the washing stage after pelletization in the EVOH process so that the EVOH resin composition and the film formed therefrom have good effects. The EVOH resin composition can be used to prepare films or multilayer structures. The inventor found that by controlling the surface roughness parameter Vmp of EVOH pellets within a specific range, the torque output during EVOH processing can be reduced, and the gel formation of the film and multilayer structure formed by the EVOH pellets can be improved.

The definition of the peak material volume (Vmp) refers to ISO 25178:2012. The Vmp is a volume parameter to quantify the size of the protruding wave crest part. When using the volume parameter, the load area ratio of the separated core part and the protruding wave crest part as well as the load area ratio of the core part and the protruding wave trough part must be specified, usually 10% and 80% respectively. The surface roughness Vmp is preferably between 0.0008 and 10 $\mu m^3/_2$. The Vmp can be, for example, between 0.0008 and 10 $\mu m^3/\mu m^2$, between 0.0008 and 9 $\mu m^3/\mu m^2$, between 0.0008 and 8 $\mu m^3/\mu m^2$, between 0.0008 and 7 $\mu m^3/\mu m^2$, between 0.0008 and 6 $\mu m^3/\mu m^2$, between 0.0008 and 5 $\mu m^3/\mu m^2$, between 0.0008 and 4 $\mu m^3/\mu m^2$, between 0.0008 and 3 $\mu m^3/\mu m^2$, between 0.0008 and 2 $\mu m^3/\mu m^2$, between 0.0008 and 1 $\mu m^3/\mu m^2$, between 0.0008 and 0.1 $\mu m^3/\mu m^2$, between 0.0008 and 0.01 $\mu m^3/\mu m^2$, between 0.0008 and 0.001 $\mu m^3/\mu m^2$, between 0.001 and 10 $\mu m^3/\mu m^2$, between 0.001 and 9 $\mu m^3/\mu m^2$, between 0.001 and 8 $\mu m^3/\mu m^2$, between 0.001 and 7 $\mu m^3/\mu m^2$, between 0.001 and 6 $\mu m^3/\mu m^2$, between 0.001 and 5 $\mu m^3/\mu m^2$, between 0.001 and 4 $\mu m^3/\mu m^2$, between 0.001 and 3

μm³/μm², between 0.001 and 2 μm³/μm², between 0.001 and 1 μm³/μm², between 0.001 and 0.1 μm³/μm², between 0.001 and 0.01 μm³/μm², between 0.1 and 10 μm³/μm², between 0.1 and 9 μm³/μm², between 0.1 and 8 μm³/μm², between 0.1 and 7 μm³/μm², between 0.1 and 6 μm³/μm², between 0.1 and 5 μm³/μm², between 0.1 and 4 μm³/μm², between 0.1 and 3 μm³/μm², between 0.1 and 2 μm³/μm², between 0.1 and 1 μm³/μm², between 0.8 and 10 μm³/μm², between 0.8 and 9 μm³/μm², between 0.8 and 8 μm³/μm², between 0.8 and 7 μm³/μm², between 0.8 and 6 μm³/μm², between 0.8 and 5 μm³/μm², between 0.8 and 4 μm³/μm², between 0.8 and 3 μm³/μm², between 0.8 and 2 μm³/μm², between 0.8 and 1 μm³/μm², between 2 and 10 μm³/μm², between 2 and 9 μm³/μm², between 2 and 8 μm³/μm², between 2 and 7 μm³/μm², between 2 and 6 μm³/μm², between 2 and 5 μm³/μm², between 2 and 4 μm³/μm², between 4 and 10 μm³/μm², between 4 and 9 μm³/μm², between 4 and 8 μm³/μm², between 4 and 7 μm³/μm², between 4 and 6 μm³/μm², between 6 and 10 μm³/μm², between 6 and 9 μm³/μm², between 6 and 8 μm³/μm², between 8 and 10 μm³/μm², or between 9 and 10 μm³/μm².

The definition of the core material volume (Vmc) refers to ISO 25178:2012. The Vmc is a volume parameter to quantify the size of the core part. As explained for Vmp, when using the volume parameter, the load area ratio of the separated core part and the protruding wave crest part as well as the load area ratio of the core part and the protruding wave trough part must be specified, usually 10% and 80% respectively. The surface roughness Vmc is preferably between 0.005 and 50 μm³/μm². The Vmc can be, for example, between 0.005 and 50 μm³/μm², between 0.005 and 45 μm³/μm², between 0.005 and 40 μm³/μm², between 0.005 and 35 μm³/μm², between 0.005 and 30 μm³/μm², between 0.005 and 25 μm³/μm², between 0.005 and 20 μm³/μm², between 0.005 and 15 μm³/μm², between 0.005 and 10 μm³/μm², between 0.005 and 5 μm³/μm², between 0.005 and 1 μm³/μm², between 0.005 and 0.1 μm³/μm², between 0.005 and 0.01 μm³/μm², between 0.01 and 50 μm³/μm², between 0.01 and 45 μm³/μm², between 0.01 and 40 μm³/μm², between 0.01 and 35 μm³/μm², between 0.01 and 30 μm³/μm², between 0.01 and 25 μm³/μm², between 0.01 and 20 μm³/μm², between 0.01 and 15 μm³/μm², between 0.01 and 10 μm³/μm², between 0.01 and 5 μm³/μm², between 0.01 and 1 μm³/μm², between 0.01 and 0.1 μm³/μm², between 1 and 50 μm³/μm², between 1 and 45 μm³/μm², between 1 and 40 μm³/μm², between 1 and 35 μm³/μm², between 1 and 30 μm³/μm², between 1 and 25 μm³/μm², between 1 and 20 μm³/μm², between 1 and 15 μm³/μm², between 1 and 10 μm³/μm², between 1 and 5 μm³/μm², between 5 and 50 μm³/μm², between 5 and 45 μm³/μm², between 5 and 40 μm³/μm², between 5 and 35 μm³/μm², between 5 and 30 μm³/μm², between 5 and 25 μm³/μm², between 5 and 20 μm³/μm², between 5 and 15 μm³/μm², between 5 and 10 μm³/μm², between 10 and 50 μm³/μm², between 10 and 45 μm³/μm², between 10 and 40 μm³/μm², between 10 and 35 μm³/μm², between 10 and 30 μm³/μm², between 10 and 25 μm³/μm², between 10 and 20 μm³/μm², between 10 and 15 μm³/μm², between 10 and 10 μm³/μm², between 20 and 50 μm³/μm², between 20 and 45 μm³/μm², between 20 and 40 μm³/μm², between 20 and 35 μm³/μm², between 20 and 30 μm³/μm², between 20 and 25 μm³/μm², between 30 and 50 μm³/μm², between 30 and 45 μm³/μm², between 30 and 40 μm³/μm², between 35 and 50 μm³/μm², between 35 and 45 μm³/μm², between 35 and 40 μm³/μm², between 40 and 50 μm³/μm², or between 40 and 45 μm³/μm².

The maximum peak height (Sp) is the maximum peak height of the surface, and its definition refers to ISO 25178: 2012. The Sp defines the height of the highest point in a range. The surface roughness Sp is preferably between 0.005 and 7 μm. The Sp can be, for example, between 0.005 and 7 μm, between 0.005 and 6 μm, between 0.005 and 5 μm, between 0.005 and 4 μm, between 0.005 and 3 μm, between 0.005 and 2 μm, between 0.005 and 1 μm, between 0.005 and 0.1 μm, between 0.005 and 0.01 μm, between 0.01 and 7 μm, between 0.01 and 6 μm, between 0.01 and 5 μm, between 0.01 and 4 μm, between 0.01 and 3 μm, between 0.01 and 2 μm, between 0.01 and 1 μm, between 0.01 and 0.1 μm, between 0.1 and 7 μm, between 0.1 and 6 μm, between 0.1 and 5 μm, between 0.1 and 4 μm, between 0.1 and 3 μm, between 0.1 and 2 μm, between 0.1 and 1 μm, between 1 and 7 μm, between 1 and 6 μm, between 1 and 5 μm, between 1 and 4 μm, between 1 and 3 μm, between 1 and 2 μm, between 2 and 7 μm, between 2 and 6 μm, between 2 and 5 μm, between 2 and 4 μm, between 2 and 3 μm, between 4 and 7 μm, between 4 and 6 μm, or between 4 and 5 μm.

In one aspect, the present invention provides an EVOH resin composition. The EVOH resin composition may be in the form of pellet(s), film(s), fiber(s), and the like. The EVOH pellets mentioned herein refer to the form and/or shape of one or more pellets of the EVOH resin composition after pelletization. Although the EVOH resin composition that is pelletized to form one or more EVOH pellets is described throughout the present invention, the EVOH resin composition can also be processed into the form of beads, cubes, chips, shavings, and the like. In some embodiments, the EVOH resin composition is in the pellet form. The so-called pellet form can be columnar, granular or flat, wherein the granular shape can be spherical, elliptical or Go-shaped, and the columnar shape can be cylindrical, elliptical columnar, or angular columnar.

When EVOH pellets are spherical, elliptical, or Go-shaped, the largest outer diameter of the pellets is taken as the long side, and the largest diameter in the cross section with the largest area in the cross section perpendicular to the long side is taken as the short side. Its long side can be 0.5-6.0 mm, 2.2-5.0 mm, 2.4-5.0 mm, 2.6-5.0 mm, 2.8-5.0 mm, 3.0-5.0 mm, 3.2-5.0 mm, 3.4-5.0 mm, 3.6-5.0 mm, 3.8-5.0 mm, 4.0-5.0 mm, 2.0-4.5 mm, 2.0-4.4 mm, 2.0-4.2 mm, 2.0-4.0 mm, 2.0-3.8 mm, 2.0-3.6 mm, 2.0-3.4 mm, 2.0-3.2 mm, or 2.0-3.0 mm; and its short side can be 0.5-6.0 mm, 1.8-4.6 mm, 2.4-4.6 mm, 2.6-4.6 mm, 2.8-4.6 mm, 3.0-4.6 mm, 3.2-4.6 mm, 3.4-4.6 mm, 3.6-4.6 mm, 3.8-4.6 mm, 4.0-4.6 mm, 1.6-4.5 mm, 1.6-4.4 mm, 1.6-4.2 mm, 1.6-4.0 mm, 1.6-3.8 mm, 1.6-3.6 mm, 1.6-3.4 mm, 1.6-3.2 mm, or 1.6-3.0 mm.

When EVOH pellets are cylindrical or elliptical columnar, the height can be 1.5-5.0 mm, 1.7-5.0 mm, 2.2-5.0 mm, 2.4-5.0 mm, 2.6-5.0 mm, 2.8-5.0 mm, 3.0-5.0 mm, 3.2-5.0 mm, 3.4-5.0 mm, 3.6-5.0 mm, 3.8-5.0 mm, 4.0-5.0 mm, 1.7-4.5 mm, 1.7-4.4 mm, 1.7-4.2 mm, 1.7-4.0 mm, 1.7-3.8 mm, 1.7-3.6 mm, 1.7-3.4 mm, 1.7-3.2 mm, or 1.7-3.0 mm; and the long axis of its cross section can be 1.5-5.0 mm, 1.7-5.0 mm, 2.2-5.0 mm, 2.4-5.0 mm, 2.6-5.0 mm, 2.8-5.0 mm, 3.0-5.0 mm, 3.2-5.0 mm, 3.4-5.0 mm, 3.6-5.0 mm, 3.8-5.0 mm, 4.0-5.0 mm, 1.7-4.5 mm, 1.7-4.4 mm, 1.7-4.2 mm, 1.7-4.0 mm, 1.7-3.8 mm, 1.7-3.6 mm, 1.7-3.4 mm, 1.7-3.2 mm, or 1.7-3.0 mm.

The surface roughness characteristics of the EVOH resin composition can also be described by the maximum line height (Rz) of the surface, and its definition standard refers to JIS B 0601-2001. The Rz is the sum of the height of the highest crest and the depth of the deepest trough in the profile curve on the reference length.

In one embodiment, the Rz of the surface of the EVOH resin composition may be 0.01-13 µm, such as 0.01-13 µm, 0.01-12 µm, 0.01-11 µm, 0.01-10 µm, 0.01-9 µm, 0.01-8 µm, 0.01-7 µm, 0.01-6 µm, 0.01-5 µm, 0.01-4 µm, 0.01-3 µm, 0.01-2 µm, 0.01-1 µm, 0.01-0.1 µm, 0.02-13 µm, 0.02-12 µm, 0.02-11 µm, 0.02-10 µm, 0.02-9 µm, 0.02-8 µm, 0.02-7 µm, 0.02-6 µm, 0.02-5 µm, 0.02-4 µm, 0.02-3 µm, 0.02-2 µm, 0.02-1 µm, 0.02-0.1 µm, 0.1-13 µm, 0.1-12 µm, 0.1-11 µm, 0.1-10 µm, 0.1-9 µm, 0.1-8 µm, 0.1-7 µm, 0.1-6µm, 0.1-5 µm, 0.1-4 µm, 0.1-3 µm, 0.1-2 µm, 0.1-1 µm, 1-13 µm, 1-12 µm, 1-11 µm, 1-10 µm, 1-9 µm, 1-8 µm, 1-7 µm, 1-6 µm, 1-5 µm, 1-4 µm, 1-3 µm, 1-2 µm, 5-13 µm, 5-12 µm, 5-11 µm, 5-10 µm, 5-9 µm, 5-8 µm, 5-7 µm, 7-13 µm, 7-12 µm, 7-11 µm, 7-10 µm, 7-9 µm, 7-8 µm, 8-13 µm, 8-12 µm, 8-11 µm, 8-10 µm, 8-9 µm, 10-13 µm, or 10-12 µm. In a preferred embodiment, the Rz of the surface is between about 0.01 and about 9.9 µm.

The EVOH pellets are formed by an EVOH with an ethylene content. For example, the ethylene content of the EVOH can range from about 20 to about 48 mole %, from about 20 to about 45 mole %, from about 25 to about 45 mole %, from about 28 to about 42 mole %, or from about 30 to about 40 mole %. The EVOH resin composition can be formed from two or more EVOHs having different ethylene contents. For example, the ethylene content of one of the EVOHs may be in the range of about 20 to about 35 mole %, such as about 24 to about 35 mole %, about 28 to about 35 mole %, about 20 to about 32 mole %, about 24 to about 32 mole %, about 28 to about 32 mole %, about 20 to about 30 mole %, or about 24 to about 30 mole %. Additionally or alternatively, the ethylene content of one of the EVOHs may be in the range of about 36 to about 48 mole %, such as about 40 to about 48 mole %, about 44 to about 48 mole %, about 36 to about 45 mole %, or about 40 to about 45 mole %. However, in some preferred embodiments, the EVOH resin composition is formed of a single EVOH having an ethylene content of about 20 to about 48 mole %.

Additionally or alternatively, the degree of saponification of the EVOH in the EVOH resin composition may be 90 mole % or higher, preferably 95 mole % or higher, preferably 97 mole % or higher, preferably 99.5 mole % or higher.

The EVOH resin composition may contain boron compounds and/or boric acid and/or cinnamic acid and/or alkali metals and/or conjugated polyenes and/or slip agents and/or alkaline earth metals, salts thereof, and/or mixtures thereof in some cases. The above-mentioned substances can give better properties to the EVOH resin composition.

In another aspect of the present invention, there is provided an EVOH resin composition (or pellets thereof), which may comprise an ethylene-vinyl alcohol copolymer and a boron compound, wherein the boron content of the EVOH resin composition is about 5-550 ppm. In some cases, the boron content of the EVOH resin composition may be about 5-550 ppm, about 5-500 ppm, about 5-450 ppm, about 5-400 ppm, about 5-350 ppm, about 5-300 ppm, about 5-250 ppm, about 5-200 ppm, about 5-150 ppm, about 5-100 ppm, about 5-50 ppm, about 10-550 ppm, about 10-500 ppm, about 10-450 ppm, about 10-400 ppm, about 10-350 ppm, about 10-300 ppm, about 10-250 ppm, about 10-200 ppm, about 10-150 ppm, about 10-100 ppm, about 10-50 ppm, about 50-550 ppm, about 50-500 ppm, about 50-450 ppm, about 50-400 ppm, about 50-350 ppm, about 50-300 ppm, about 50-250 ppm, about 50-200 ppm, about 50-150 ppm, about 50-100 ppm, about 100-550 ppm, about 100-500 ppm, about 100-450 ppm, about 100-400 ppm, about 100-350 ppm, about 100-300 ppm, about 100-250 ppm, about 100-200 ppm, about 100-150 ppm, about 200-550 ppm, about 200-500 ppm, about 200-450 ppm, about 200-400 ppm, about 200-350 ppm, about 200-300 ppm, about 200-250 ppm, about 300-550 ppm, about 300-500 ppm, about 300-450 ppm, about 300-400 ppm, about 300-350 ppm, about 400-550 ppm, about 400-500 ppm, about 400-450 ppm, or about 500-550 ppm based on the total weight of the EVOH resin composition. Without being limited to any specific theory, it is believed that adding a boron compound to the EVOH resin composition and making the boron content of EVOH be 5 to 550 ppm reduces or eliminates the adhesion of the EVOH resin composition during the extrusion process through the screw extruder, and further improves the thickness uniformity and flexibility of the film. In some cases, such EVOH resin composition can clean the screw extruder by removing or at least partially removing the EVOH resin previously adhered to the inner surface of the screw extruder during the extrusion process, so that the material has a self-cleaning function, which can further improve the film thickness uniformity.

The boron compound may, in some instances, include boric acid or a metal salt thereof. Examples of the metal salt include, but are not limited to, calcium borate, cobalt borate, zinc borate (e.g., zinc tetraborate or zinc metaborate), potassium aluminum borate, ammonium borate (e.g., ammonium metaborate, ammonium tetraborate, ammonium pentaborate, or ammonium octaborate), cadmium borate (e.g., cadmium orthoborate or cadmium tetraborate), potassium borate (e.g., potassium metaborate, potassium tetraborate, potassium pentaborate, potassium hexaborate, or potassium octaborate), silver borate (e.g., silver metaborate or silver tetraborate), copper borate (e.g., copper (II) borate, copper metaborate, or copper tetraborate), sodium borate (e.g., sodium metaborate, sodium diborate, sodium tetraborate, sodium pentaborate, sodium hexaborate, or sodium octaborate), lead borate (e.g., lead metaborate or lead hexaborate), nickel borate (e.g., nickel orthoborate, nickel diborate, nickel tetraborate, or nickel octaborate), barium borate (e.g., barium orthoborate, barium metaborate, barium diborate, or barium tetraborate), bismuth borate, magnesium borate (e.g., magnesium orthoborate, magnesium diborate, magnesium metaborate, trimagnesium tetraborate, or pentamagnesium tetraborate), manganese borate (e.g., manganese (I) borate, manganese metaborate, or manganese tetraborate), lithium borate (e.g., lithium metaborate, lithium tetraborate, or lithium pentaborate), salts thereof, or combinations thereof. Borate mineral such as borax, kainite, inyonite, kotoite, suanite, azaibelyite, and szaibelyite may be included. Of these, borax, boric acid, and sodium borate such as sodium metaborate, sodium diborate, sodium tetraborate, sodium pentaborate, sodium hexaborate, and sodium octaborate are preferably used.

In some cases, the EVOH resin composition may further include alkali metals. The alkali metal source for the EVOH resin composition of the present invention to contain the above-mentioned alkali metal includes alkali metal compounds such as alkali metal oxides, alkali metal hydroxides, and alkali metal salts. They are preferably water-soluble. Among them, from the viewpoint of dispersibility, alkali metal salts are preferred. Examples of alkali metal salts include inorganic salts such as alkali metal carbonate, bicarbonate, phosphate, borate, sulfate, and chloride salt; alkali metal acetate, butyrate, propionate, heptanoate, caprate, and other monocarboxylates with carbon numbers from 2 to 11; alkali metal oxalate, malonate, succinate, adipate, suberate, sebacate and other dicarboxylates with carbon numbers from 2 to 11; and the carboxylate of the polymerized terminal carboxyl group of EVOH. These can be used alone or in combination of two or more.

The alkali metals used in the present invention include lithium, sodium, potassium, rubidium, and cesium. These can be used alone or in combination of two or more. Among them, sodium and potassium are preferred, and sodium is particularly preferred.

The EVOH resin composition may have an alkali metal content of about 5-550 ppm. The alkali metal content can be, for example, 5-550 ppm, about 5-500 ppm, about 5-450 ppm, about 5-400 ppm, about 5-350 ppm, about 5-300 ppm, about 5-250 ppm, about 5-200 ppm, about 5-150 ppm, about 5-100 ppm, about 5-50 ppm, about 10-550 ppm, about 10-500 ppm, about 10-450 ppm, about 10-400 ppm, about 10-350 ppm, about 10-300 ppm, about 10-250 ppm, about 10-200 ppm, about 10-150 ppm, about 10-100 ppm, about 10-50 ppm, about 50-550 ppm, about 50-500 ppm, about 50-450 ppm, about 50-400 ppm, about 50-350 ppm, about 50-300 ppm, about 50-250 ppm, about 50-200 ppm, about 50-150 ppm, about 50-100 ppm , about 100-550 ppm, about 100-500 ppm, about 100-450 ppm, about 100-400 ppm, about 100-350 ppm, about 100-300 ppm, about 100-250 ppm, about 100-200 ppm, about 100-150 ppm, about 200-550 ppm, about 200-500 ppm, about 200-450 ppm, about 200-400 ppm, about 200-350 ppm, about 200-300 ppm, about 200-250 ppm, about 300-550 ppm, about 300-500 ppm, about 300-450 ppm, about 300-400 ppm, about 300-350 ppm, about 400-550 ppm, about 400-500 ppm, about 400-450 ppm, or about 500-550 ppm.

Additionally or alternatively, the EVOH resin composition may further include one or a combination of cinnamic acid, conjugated polyene, slip agent and alkaline earth metal, or a salt thereof and/or a mixture thereof. The above-mentioned substances are common substances usually present in the EVOH resin composition, giving it better properties. If the content of the conjugated polyene in the EVOH resin composition per unit weight is 1 to 30000 ppm, the coloration after heating can be further suppressed and the thermal stability can be improved. If the content of the alkali metal compound or alkaline earth metal compound in the EVOH resin composition per unit weight is 1 to 1000 ppm in terms of metal, the long-term operation formability can be improved.

The conjugated polyene is, for example, but not limited to, a conjugated diene composed of a conjugated structure of 2 carbon-carbon double bonds, such as isoprene, 2,3-dimethyl-1,3-butadiene, 2-tert-butyl-1,3-butadiene, 1,3-pentadiene, 2,4-dimethyl-1,3-pentadiene, 3,4-dimethyl-1,3-pentadiene, 3-ethyl-1,3-pentadiene, 2-methyl-1,3-pentadiene, 4-methyl-1,3-pentadiene, 1,3-hexadiene, 2,5-dimethyl-2,4-hexadiene, 1,3-octadiene, 1,3-cyclopentadiene, 1,3-cyclohexadiene, 1,4-diphenyl-1,3-butadiene, 1-methoxy-1,3-butadiene, 2-methoxy-1,3-butadiene, 1-ethoxy-1,3-butadiene, 2-ethoxy-1,3-butadiene, 2-nitro-1,3-butadiene, chloroprene, 1-chloro-1,3-butadiene, 1-bromo-1,3-butadiene, tropone, ocimene, ferrandrene, myrcene, farnesene, sorbic acids (e.g., sorbic acid or sorbate), or abietic acid; or a conjugated triene composed of a conjugated structure of 3 carbon-carbon double bonds, such as 2,4,6-octatriene-1-carboxylic acid, eleostearic acid, tung oil, or cholecalciferol. The conjugated polyene may be used in combination of two or more. Preferable conjugated polyenes are sorbic acids such as sorbic acid and sorbate.

The slip agent used in the present invention may include higher fatty acids, such as higher fatty acid (e.g., oleic acid, lauric acid, palmitic acid, myristic acid, stearic acid, or docosanoic acid); metal salt of higher fatty acid (e.g., aluminum, calcium, zinc, magnesium, or barium salt of the above-mentioned higher fatty acid); ester of higher fatty acid (e.g., methyl, isopropyl, butyl, or octyl ester of the above-mentioned higher fatty acid); saturated higher fatty acid amide (e.g., stearic acid amide or docosanoic acid amide); unsaturated higher fatty acid amide (e.g., oleic acid amide or erucamide); or double higher fatty acid amide (e.g., vinyl bis-stearyl amide, vinyl bis-oleic acid amide, vinyl bis-erucamide, or vinyl bis-lauric acid amide). These can be used alone or in combination of two or more.

The EVOH resin composition is beneficial to more efficiently prepare the EVOH film formed therefrom. Suitable methods and equipment for preparing the EVOH film may include methods and equipment easily understood by those skilled in the art. The inventor believes that by controlling the surface roughness of the EVOH resin composition, the EVOH resin composition can reduce the torque in the extruder, and can also reduce the gel production of the film or multilayer structure formed by the EVOH resin composition, and improve the appearance of the film or multilayer structure formed by the EVOH resin composition.

The EVOH resin composition of the present invention usually has a specific range of moisture content. For example, the moisture content of the EVOH resin composition is evaluated by volatile content. The moisture content of the EVOH resin composition can be less than 1 wt %, less than 0.9%, less than 0.8%, less than 0.7%, less than 0.6%, less than 0.5%, less than 0.4%, less than 0.3%, less than 0.2%, less than 0.1%, between 0.01 and 1 wt %, between 0.08 and 1 wt %, between 0.05 and 1 wt %, or between 0.01 and 0.5 wt %. It was unexpectedly discovered that the moisture content of the EVOH resin composition must be controlled within a certain range, otherwise excessively high moisture content will cause bubbles, uneven film thickness and increased flow marks in the film or multilayer structure formed by the EVOH resin composition, causing problems in subsequent processing. The volatile content was analyzed using the method of ISO 14663-2 Annex A.

In yet another aspect, the present invention provides a multilayer structure having at least one layer formed from the EVOH resin composition of the present invention; at least one polymer layer; and at least one adhesive layer. The polymer layer can be selected from a low-density polyethylene layer, a polyethylene grafted maleic anhydride layer, a polypropylene layer, a nylon layer, and combinations thereof. The adhesive layer may be a tie layer, such as ARKEMA OREVAC 18729 from ARKEMA.

EXAMPLE

The following non-limiting examples of various aspects of the present invention are provided mainly to illustrate the various aspects of the invention and the benefits derived therefrom.

Example 1

A non-limiting preparation method of EVOH pellets formed from the EVOH resin composition is provided as follows. 6 non-limiting example EVOH resin compositions (Example EVOH 1-6) and 4 comparative example EVOH resin compositions (Comparative Example EVOH 1-4) were prepared according to a method similar to the method disclosed below. However, the specific methods for preparing Example EVOH 1-6 and Comparative Example EVOH 1-4 were generally different from the methods disclosed below in one or more aspects.

Example EVOH 1 Pellets 500 kg of vinyl acetate, 100 kg of methanol, 0.0585 kg of acetyl peroxide, and 0.015 kg of citric acid were put into a polymerization vessel equipped with a cooling coil. After temporarily replacing the inside of the polymerization vessel with nitrogen, it was replaced with ethylene until the pressure of ethylene reached 45 kg/cm$^2$. Under pressure of ethylene, the temperature was raised to 67° C. while stirring to start polymerization. Six hours after the start of the polymerization, when the polymerization rate reached 60%, 0.0525 kg of sorbic acid conjugated polyene as a polymerization inhibitor was added. Thus, an ethylene-vinyl acetate copolymer having an ethylene structural unit content of 44 mole % was obtained. Then, the reaction liquid containing the ethylene-vinyl acetate copolymer was supplied to the distillation tower, and methanol vapor was introduced from the lower part of the tower to remove unreacted vinyl acetate, thereby obtaining a methanol solution of the ethylene-vinyl acetate copolymer.

For Example EVOH 1, a component formed by polymerizing ethylene monomer and vinyl acetate monomer (i.e., ethylene-vinyl acetate copolymer, hereinafter referred to as "EVAC" polymer) was saponified to form EVOH.

Subsequently, EVOH was dissolved in a solution with a ratio of methanol to water of 60:40. The EVOH/methanol/water solution was placed at 60° C. for 1 hour to promote the dissolution of EVOH in the EVOH/methanol/water solution. The solid content of this EVOH/methanol/water solution was 41 wt %.

Then the solution of methanol, water and EVOH was pelletized through underwater pelletization. Specifically, the solution of methanol, water and EVOH was pumped into the feed pipe using a pump at a flow rate of 120 L/min, and then fed into the input pipe with a diameter of 2.8 mm, and then cut with a rotary knife at 1500 rpm to obtain EVOH pellets. At the same time, 5° C. circulating condensate water was used to cool EVOH pellets. Subsequently, the EVOH pellets were centrifuged to separate EVOH particles, and the separated round EVOH particles were washed with water and centrifuged again. Next, the EVOH particles were immersed in a boric acid/sodium acetate solution and then dried and added with calcium stearate to obtain the final product of EVOH pellets. The final product of the round EVOH pellets had a long side of 2.4 mm and a short side of 1.5 mm.

When performing the first centrifugation and washing step, the rotation speed of the dehydrator was 3000 rpm, the ratio of water/wet pellets was 10 during transportation, and the centrifugal pump for transportation was a semi-open type and the rotation speed was 2000 rpm; and during washing, the weight ratio of water/wet particles was 20 and the water flow rate was 1 m/min. During the second centrifugation and washing step, the rotation speed of the dehydrator was 4000 rpm, and the drying was carried out until the moisture content was 0.1%.

Example EVOH 2 Pellets

The EVOH pellets used in Example EVOH 2 were prepared using a process similar to that of Example EVOH 1 pellets. However, when the EVOH pellets of Example EVOH 2 were prepared, the EVOH pellets were immersed in a boric acid/sodium acetate solution, and the wet round pellets had a long side of 3.0 mm and a short side of 2.4 mm. In addition, when performing the first centrifugation and washing step, the rotation speed of the dehydrator was 2000 rpm, the ratio of water/wet pellets during transportation was 20, the centrifugal pump for transportation was an open type and the rotation speed was 4000 rpm, and the ratio of water/wet pellets was 10 and the water flow rate was 1.5 m/min during washing; and when performing the second centrifugation and washing step, the rotation speed of the dehydrator was 3000 rpm, and the drying was carried out until the moisture content was 0.01%.

Example EVOH 3 Pellets

The EVOH pellets used in Example EVOH 3 were prepared using a process similar to that of Example EVOH 1 pellets. However, when preparing the EVOH pellets of Example EVOH 3, the EVOH pellets were immersed in a boric acid/sodium acetate solution, and the wet round pellets had a long side of 5.0 mm and a short side of 5.0 mm. In addition, when performing the first centrifugation and washing step, the rotation speed of the dehydrator was 1500 rpm, the ratio of water/wet pellets was 5 during transportation, the centrifugal pump for transportation was an open type and the rotation speed was 3000 rpm, and the ratio of water/wet pellets was 25 and the water flow rate was 2.5 m/min during washing; and when performing the second centrifugation and washing step, the rotation speed of the dehydrator was 1000 rpm, and the drying was carried out until the moisture content was 0.3%.

Example EVOH 4 Pellets

The EVOH pellets used in Example EVOH 4 were prepared using a process similar to that of Example EVOH 1 pellets. However, when preparing the EVOH pellets of Example EVOH 4, the EVOH pellets were immersed in a boric acid/sodium acetate solution, and the wet round pellets had a long side of 0.5 mm and a short side of 0.5 mm. In addition, when performing the first centrifugation and washing step, the rotation speed of the dehydrator was 4000 rpm, the ratio of water/wet pellets was 15 during transportation, the centrifugal pump for transportation was a semi-open type and the rotation speed was 1000 rpm, and the ratio of water/wet pellets was 15 and the water flow rate was 5 m/min when washing; and when performing the second centrifugation and washing step, the rotation speed of the dehydrator was 2000 rpm, and the drying was performed until the moisture content was 0.5%.

Example EVOH 5 Pellets

The EVOH pellets used in Example EVOH 5 were prepared using a process similar to that of Example EVOH 1 pellets. However, the ethylene content of the EVOH pellets of Example EVOH 5 was 28 mole %, and when the EVOH pellets of Example EVOH 5 were prepared, the EVOH pellets were immersed in a boric acid/sodium acetate solution, and the long and short sides of the wet round pellets were both 2.5 mm. In addition, when performing the first centrifugation and washing step, the rotation speed of the dehydrator was 1000 rpm, the ratio of water/wet pellets was 5 during transportation, the centrifugal pump for transportation was an open type and the rotation speed was 3000 rpm, and the ratio of water/wet pellets was 20 and the water flow rate was 3.5 m/min during washing; and when performing the second centrifugation and washing step, the rotation speed of the dehydrator was 3000 rpm, and the drying was performed until the moisture content was 0.04%.

Example EVOH 6 Pellets

The EVOH pellets used in Example EVOH 6 were prepared using a process similar to that of Example EVOH 1 pellets. However, the ethylene content of the EVOH pellets of Example EVOH 6 was 28 mole %, and when the EVOH pellets of Example EVOH 6 were prepared, the EVOH pellets were immersed in the boric acid/sodium acetate solution, and the long and short sides of the wet round pellets were both 5 mm. In addition, when performing the first centrifugation and washing step, the rotation speed of the dehydrator was 3000 rpm, the ratio of water/wet pellets was 5 during transportation, the centrifugal pump for transportation was a semi-open type and the rotation speed was 4000 rpm, and the ratio of water/wet pellets was 15 and the water flow rate was 2.5 m/min when washing; and when performing the second centrifugation and washing step, the rotation speed of the dehydrator was 3000 rpm, and the drying was performed until the moisture content was 0.05%.

Comparative Example EVOH 1 Pellets

The EVOH pellets used in Comparative Example EVOH 1 were prepared using a process similar to that of Example EVOH 1 pellets. However, when preparing the EVOH pellets of Comparative Example EVOH 1, the EVOH pellets were immersed in a boric acid/sodium acetate solution, and the long and short sides of the wet round pellets were both 6 mm. In addition, when performing the first centrifugation and washing step, the rotation speed of the dehydrator was 2000 rpm, the ratio of water/wet pellets was 1 during transportation, the centrifugal pump for transportation was a semi-open type and the rotation speed was 4000 rpm, and the ratio of water/wet pellets was 5 and the water flow rate was 20 m/min when washing; and when performing the second centrifugation and washing step, the rotation speed of the dehydrator was 8000 rpm, and the drying was performed until the moisture content was 0.07%.

Comparative Example EVOH 2 Pellets

The EVOH pellets used in Comparative Example EVOH 2 were prepared using a process similar to that of Example EVOH 1 pellets. However, when the EVOH pellets of Comparative Example EVOH 2 were prepared, the EVOH pellets were immersed in a boric acid/sodium acetate solution, and the long and short sides of the wet round pellets were both 1 mm. In addition, when performing the first centrifugation and washing step, the rotation speed of the dehydrator was 5000 rpm, the ratio of water/wet pellets was 10 during transportation, the centrifugal pump for transportation was a closed type and its rotation speed was 7000 rpm, and the ratio of water/wet pellets was 0.5 and the water flow rate was 5 m/min when washing; and when performing the second centrifugation and washing step, the rotation speed of the dehydrator was 3000 rpm, and the drying was performed until the moisture content was 0.8%.

Comparative Example EVOH 3 Pellets

The EVOH pellets used in Comparative Example EVOH 3 were prepared using a process similar to that of Example EVOH 1 pellets. However, when the EVOH pellets of Comparative Example EVOH 3 were prepared, the EVOH pellets were immersed in a boric acid/sodium acetate solution, and the long and short sides of the wet round pellets were both 4.5 mm. In addition, when performing the first centrifugation and washing step, the rotation speed of the dehydrator was 2000 rpm, the ratio of water/wet pellets was 50 during transportation, the centrifugal pump for transportation was an open type and the rotation speed was 1000 rpm, and the ratio of water/wet pellets was 100 and the water flow rate was 0.5 m/min when washing; and during the second centrifugation and washing step, the rotation speed of the dehydrator was 1000 rpm, and the drying was carried out until the moisture content was 0.5%.

Comparative Example EVOH 4 Pellets

The EVOH pellets used in Comparative Example EVOH 4 were prepared using a process similar to that of Example EVOH 1 pellets. However, when the EVOH pellets of Comparative Example EVOH 4 were prepared, the EVOH pellets were immersed in a boric acid/sodium acetate solution, and the long and short sides of the wet round pellets were both 5.1 mm. In addition, when performing the first centrifugation and washing step, the rotation speed of the dehydrator was 3000 rpm, the ratio of water/wet pellets was 3 during transportation, the centrifugal pump for transportation was a semi-open type and the rotation speed was 3000 rpm, and the ratio of water/wet pellets was 8 and the water flow rate was 10 m/min when washing; and when performing the second centrifugation and washing step, the rotation speed of the dehydrator was 3000 rpm, and the drying was performed until the moisture content was 0.4%.

Example 2

The films were respectively formed using the pellets of Example EVOH 1 to 6 according to the following method. The pellets of Example EVOH 1 to 6 and that of Comparative Example EVOH 1 to 4 were sent to a single-layer T-die cast film extruder (optical control system MEV4) to prepare films. The thickness of the films formed from the pellets of Example EVOH 1 to 6 and the pellets of Comparative Example EVOH 1 to 4 were each 20 um. The temperature of the extruder was set at 220° C., and the temperature of the mold (i.e., T-die) was set at 230° C. The rotation frequency of the screw was 7 rpm (rotations/minutes).

Example 3

The pellets of Example EVOH 1 to 6 and the pellets of Comparative Example EVOH 1 to 4 were evaluated to judge the properties of these EVOH pellets and the films formed therefrom. As described above, the pellets of Example EVOH 1 to 6 were prepared according to a method similar to the method described in Example 1 above. However, the preparation methods of the pellets of Example EVOH 1 to 6 were different for the prepared EVOH pellets in terms of having different Vmp, Vmc, Sp, Rz, boron content or alkali metal content. The pellets of Comparative Example EVOH 1 to 4 were also prepared according to a method similar to that described in Example 1.

The average torque and current of the single screw extruder were further evaluated. The films were individually formed from Example EVOH 1 to 6 and Comparative Example EVOH 1 to 4 according to a method similar to that described in Example 2, and were evaluated to determine the size and amount of gel on the film.

The following Table 1 provides a summary of some attributes (i.e., Vmp, Vmc, Sp, Rz, boron content, alkali metal content, average torque of extruder, and current of extruder) of the pellets of Example EVOH 1 to 6 and Comparative Example EVOH 1 to 4, as well as the conditions of gel generation on the EVOH films formed from Example EVOH 1 to 6 and Comparative Example EVOH 1 to 4.

TABLE 1

|  | Example EVOH 1 | Example EVOH 2 | Example EVOH 3 | Example EVOH 4 | Example EVOH 5 | Example EVOH 6 |
|---|---|---|---|---|---|---|
| Vmp ($\mu m^3/\mu m^2$) | 0.001 | 0.8 | 3.1 | 5.2 | 9.8 | 9.2 |
| Vmc ($\mu m^3/\mu m^2$) | 0.01 | 4.3 | 10.6 | 22.3 | 39.5 | 35.4 |
| Sp ($\mu m$) | 0.01 | 0.35 | 1.0 | 2.2 | 4.7 | 4.1 |
| Rz ($\mu m$) | 0.02 | 0.899 | 9.34 | 0.644 | 5.41 | 12.35 |
| boron content (ppm) | 50 | 150 | 280 | 10 | 500 | 430 |
| sodium content (ppmm) | 10 | 70 | 500 | 430 | 220 | 370 |
| 0-100 $\mu m$ gel | ○ | ○ | ○ | ○ | ○ | ○ |
| 100-200 $\mu m$ gel | ○ | ○ | ○ | ○ | ○ | Δ |
| >200 $\mu m$ gel | ○ | ○ | ○ | ○ | ○ | ○ |
| average torque of single screw extruder (Torque) | 21 | 15 | 33 | 41 | 24 | 63 |
| current of single screw extruder (Å) | 33 | 26.2 | 48 | 65 | 42 | 71.4 |

|  | Comparative Example EVOH 1 | Comparative Example EVOH 2 | Comparative Example EVOH 3 | Comparative Example EVOH 4 |
|---|---|---|---|---|
| Vmp ($\mu m^3/\mu m^2$) | 22.3 | 44.6 | 0.0005 | 12.1 |
| Vmc ($\mu m^3/\mu m^2$) | 66.4 | 110.3 | 0.004 | 72.3 |
| Sp ($\mu m$) | 12 | 15 | 0.0005 | 8.2 |
| Rz ($\mu m$) | 11.05 | 29.73 | 0.01 | 3.66 |
| boron content (ppm) | 180 | 220 | 170 | 50 |
| sodium content (ppm) | 80 | 500 | 240 | 360 |
| 0-100 $\mu m$ gel | ○ | ○ | X | ○ |
| 100-200 $\mu m$ gel | X | X | ○ | X |
| >200 $\mu m$ gel | X | X | ○ | ○ |
| average torque of single screw extruder (Torque) | 133 | 169 | 10 | 78.9 |
| current of single screw extruder (Å) | 271 | 312 | 11 | 92.1 |

The boron content of each Example and Comparative Example was measured by the following method. First, a sample of 0.1 g EVOH pellets was decomposed by concentrated nitric acid and microwave to make EVOH pellets form a sample solution. Then the sample solution was diluted with pure water to adjust its concentration to 0.75 mg/mL. The boron content in the sample solution was measured using inductively coupled plasma optical emission spectrometry (ICP-OES; iCAP7000, Thermo Fisher Scientific). The boron content refers to the measured value corresponding to the boron content derived from the boron compound used.

In addition, the alkali metal content in the EVOH pellets of the respective Examples and Comparative Examples was also measured. 2 g of the above-mentioned EVOH pellets were put into a platinum dish, added with a few milliliters of sulfuric acid, and then heated with a gas burner. After confirming that the pellets were carbonized and the sulfuric acid white smoke disappeared, the substance was added with a few drops of sulfuric acid and then heated again. This operation was repeated until the organic matter disappeared and the matter was completely ashed. After ashing, the platinum dish was cooled, and 1 mL of hydrochloric acid was added to dissolve the substance. This hydrochloric acid solution was washed with ultrapure water and the volume was made up to 50 mL. The alkali metal content in this sample solution was determined by inductively coupled plasma atomic emission spectrometry (ICP-AES; 720-ES, Agilent Technology). Finally, the alkali metal content in the above-mentioned EVOH composition pellets was converted from the alkali metal concentration in the solution.

In order to evaluate the surface roughness of Example EVOH 1-6 pellets and Comparative Example EVOH 1-4 pellets, the EVOH pellets were placed flat on the board, and the surface roughness of the pellets was measured. When measuring, it was necessary to exclude the data when the inclination was greater than 0.5 to ensure that the scanning plane was relatively horizontal. Inclination=Maximum surface height Sz/Side length of the analysis range (i.e., 129 $\mu m$). The laser microscope was LEXT OLS5000-SAF manufactured by Olympus, and the image was made at an air temperature of 24±3° C. and a relative humidity of 63±3%. The filter was set to no filter. The light source was a light source with a wavelength of 405 nm. The objective lens was a 100× magnifying glass (MPLAPON-100×LEXT). The optical zoom was set to 1.0×. The image area was set to 129

μm×129 μm. (When measuring Rz, the center line of the image area was taken.) The resolution was set to 1024 pixels×1024 pixels. The value of 100 pellets was measured and the average value was taken. Among them, Vmp, Vmc and Sp were measured by the method of ISO 25178:2012, and Rz was measured by the method of JIS B 0601-2001.

Calculation of the torque and current of the extruder during the processing of Example EVOH 1-6 and Comparative Example EVOH 1-4: When EVOH pellets were extruded with the single screw extruder (model: ME25/5800V4, brand: OCS), the torque value and current value of the extruder were measured. The extrusion conditions were as follows: the temperature of the screw was Zone1 195° C., Zone2 215° C., Zone3 220° C., Zone4 230° C., and Zone5 230° C.; and the rotation speed of the screw was 7 rpm. The calculation time was 10 to 60 minutes, and 1 point was recorded every 1 minute, and then the average value was calculated.

The results show that Example EVOH 1 to 6 had lower torque output (15 to 41 Torque) and current (26.2 to 65 Å), showing that Example EVOH 1 to 6 showed excellent processing torque output.

In addition, the gel formation of the films formed by Example EVOH 1-6 and Comparative Example EVOH 1-4 was calculated. After EVOH was processed into a single-layer film, the FSA-100 film quality test system was used to analyze the amount of gel on the single-layer film, and the gel formation was evaluated based on the evaluation criteria. If the number of gels of <100 μm was less than 450, "O" was marked as "excellent"; if the number of gels of <100 μm was 450-1000, "Δ" was marked as "acceptable"; and if the number of gels of <100 μm was more than 1000, "X" was marked as "poor". If the number of gels of 100-200 μm was less than 50, "O" was marked as "excellent"; if the number of gels of 100-200 μm was 50-100, "Δ" was marked as "acceptable"; and if the number of gels of 100-200 μm was more than 100, "X" was marked as "poor". If the number of gels of >200 μm was less than 10, "O" was marked as "excellent"; if the number of gels of >200 μm was 10-20, "Δ" was marked as "acceptable"; and if the number of gels of >200 μm was more than 20, "X" was marked as "poor".

On the films formed by Example EVOH 1 to 6, the number of gels of <100 μm is less than 450, the number of gels of 100-200 μm is less than 100, and the number of gels of >200 μm is less than 10, showing excellent characteristics.

The inventor found that if the surface roughness of the EVOH pellets is too high, when the pellets are processed by a single screw and friction occurs, local overheating is likely to cause cross-linking, and large gels are likely to be generated during processing. If the surface roughness of the EVOH pellets is too low, the EVOH will not be able to melt due to insufficient frictional heat during processing, and tiny gels will be produced after extrusion. Therefore, it is necessary to control the surface roughness of the EVOH pellets within a certain range to avoid gel formation.

By comparing the examples and comparative examples in Table 1, the inventor found that by controlling the production method variation factor of the washing process during the processing of EVOH pellets, i.e., controlling the variation factor of the EVOH pellets immersed in the boric acid/sodium acetate solution, the desired surface roughness of the present invention can be obtained, which is further explained as follows:

If the pellets are too large or too small, they are likely to collide with each other and cause friction during transportation in the water.

Excessively high rotation speed of the dehydrator, excessively low ratio of water/wet pellets, centrifugal pump of closed type used during transportation, excessively high rotation speed of the pump during transportation, excessive water flow rate, etc. will cause the wet pellets to collide and rub against each other during the washing process.

In Comparative Example 1, because the pellets were too large, the ratio of water/wet pellets during transportation was too low, and the rotation speed of the dehydrator during the second centrifugation was too high, the wet pellets rubbed severely with each other and the roughness increased. In Comparative Example 2, because the pellets were too small, the rotation speed of the dehydrator during the first centrifugation was too high, the centrifugal pump of closed type was used, the rotation speed of the pump during transportation was too high, and the ratio of water/wet pellets during washing was too low, the wet pellets rubbed severely with each other and the roughness increased. In Comparative Example 3, the ratio of water/wet pellets during transportation was too high, the rotation speed of the pump during transportation was too low, the ratio of wet pellets during washing was too high, and the water flow rate was too low, resulting in insufficient friction of the pellets and insufficient roughness.

The test results of the present invention show that as long as the surface roughness of EVOH is controlled within a specific range, the torque and current in the single screw extruder as well as the gel production of the EVOH film can be reduced. As shown in Table 1, Comparative Example EVOH 1, 2 and 4 have Vmp, Vmc and Sp beyond the expected range described in this article, and their test results all show that they have higher torque output of the extruder and current of the extruder, and the films formed by them produce too much gel. Comparative Example EVOH 3 has Vmp, Vmc, and Sp lower than the expected range described herein; although its test results show that it has good torque output and current, the film formed by Comparative Example EVOH 3 produces too much gel and has undesirable properties.

In summary, the EVOH resin composition of the present invention has a low surface roughness, especially a surface roughness of Vmp between 0.0008 to 10 $\mu m^3/\mu m^2$. In addition, the surface roughness of the EVOH resin composition of the present invention can further be Vmc between 0.005 and 50 $\mu m^3/\mu m^2$ and/or Sp between 0.005 and 7 μm. The control of the surface roughness of the EVOH resin composition can be achieved by manipulating the variable factors in the washing stage of the EVOH process. The EVOH resin composition can be used to prepare films or multilayer structures. The inventor found that by controlling the surface roughness of EVOH pellets, the torque output during EVOH processing can be reduced, and the excessive amount of gel produced by the film formed by EVOH can be reduced.

As used herein, all ranges provided are meant to include every specific range within, and combination of sub ranges between, the given ranges. Additionally, all ranges provided herein are inclusive of the end points of such ranges, unless stated otherwise. Thus, a range from 1 to 5 includes specifically 1, 2, 3, 4, and 5, as well as sub ranges such as 2-5, 3-5, 2-3, 2-4, 1-4, etc.

All publications and patent applications cited in this specification are herein incorporated by reference, and for any and all purposes, as if each individual publication or patent application is specifically and individually indicated to be incorporated by reference. In the event of an inconsistency between the present disclosure and any publication or patent application incorporated herein by reference, the present disclosure controls.

As used herein, the terms "comprising," "having," and "including" are used in their open and non-limiting sense. The terms "a," "an," and "the" are understood to encompass the plural as well as the singular. The expression "one or more" means "at least one" and thus may include an individual characteristic or mixtures/combinations.

Other than in the operating examples, or where otherwise indicated, all numbers expressing quantities of ingredients and/or reaction conditions may be modified in all instances by the term "about," meaning within ±5% of the indicated number. The term "substantially free" or "essentially free" as used herein means that there is less than about 2% of the specific characteristic. All elements or characteristics positively set forth in this disclosure can be negatively excluded from the claims.

What is claimed is:

1. An ethylene-vinyl alcohol copolymer resin composition in the form of pellet, comprising an ethylene-vinyl alcohol copolymer resin, wherein the ethylene-vinyl alcohol copolymer resin composition has a surface with a peak material volume (Vmp) between 0.0008 and 10 $\mu m^3/\mu m^2$.

2. The ethylene-vinyl alcohol copolymer resin composition of claim 1, wherein the surface of the ethylene-vinyl alcohol copolymer resin composition has a core material volume (Vmc) ranging from 0.005 to 50 $\mu m^3/\mu m^2$.

3. The ethylene-vinyl alcohol copolymer resin composition of claim 1, wherein the surface of the ethylene-vinyl alcohol copolymer resin composition has a maximum peak height (Sp) ranging from 0.005 to 7 $\mu m$.

4. The ethylene-vinyl alcohol copolymer resin composition of claim 1, wherein the ethylene-vinyl alcohol copolymer resin has an ethylene content of 20-48 mole %.

5. The ethylene-vinyl alcohol copolymer resin composition of claim 1, wherein the ethylene-vinyl alcohol copolymer resin has a saponification degree greater than 99.5 mole %.

6. The ethylene-vinyl alcohol copolymer resin composition of claim 1, wherein the surface has a maximum line height (Rz) between 0.01 and 13 $\mu m$.

7. The ethylene-vinyl alcohol copolymer resin composition of claim 6, wherein the maximum line height (Rz) of the surface is between 0.01 and 9.9 $\mu m$.

8. The ethylene-vinyl alcohol copolymer resin composition of claim 1 having a moisture content of less than 1 wt %.

9. The ethylene-vinyl alcohol copolymer resin composition of claim 1 having a boron content between 5 and 550 ppm.

10. The ethylene-vinyl alcohol copolymer resin composition of claim 1 having an alkali metal content ranging from 5 to 550 ppm.

11. The ethylene-vinyl alcohol copolymer resin composition of claim 1 further including one or a combination of the group consisting of cinnamic acid, conjugated polyene, slip agent and alkaline earth metal.

12. An ethylene-vinyl alcohol copolymer film formed from the ethylene-vinyl alcohol copolymer resin composition of claim 1.

13. A multilayer structure, comprising:
(a) at least one layer formed from the ethylene-vinyl alcohol copolymer resin composition of claim 1;
(b) at least one polymer layer; and
(c) at least one adhesive layer.

14. The multilayer structure of claim 13, wherein the polymer layer is selected from a group consisting of low density polyethylene layer, polyethylene grafted maleic anhydride layer, polypropylene layer and nylon layer, and the adhesive layer is a tie layer.

* * * * *